E. RAMMELSBERG.
RAIL BRAKE FOR RAILROAD CARS.
APPLICATION FILED MAY 22, 1915.
1,195,086.
Patented Aug. 15, 1916.
2 SHEETS—SHEET 2.
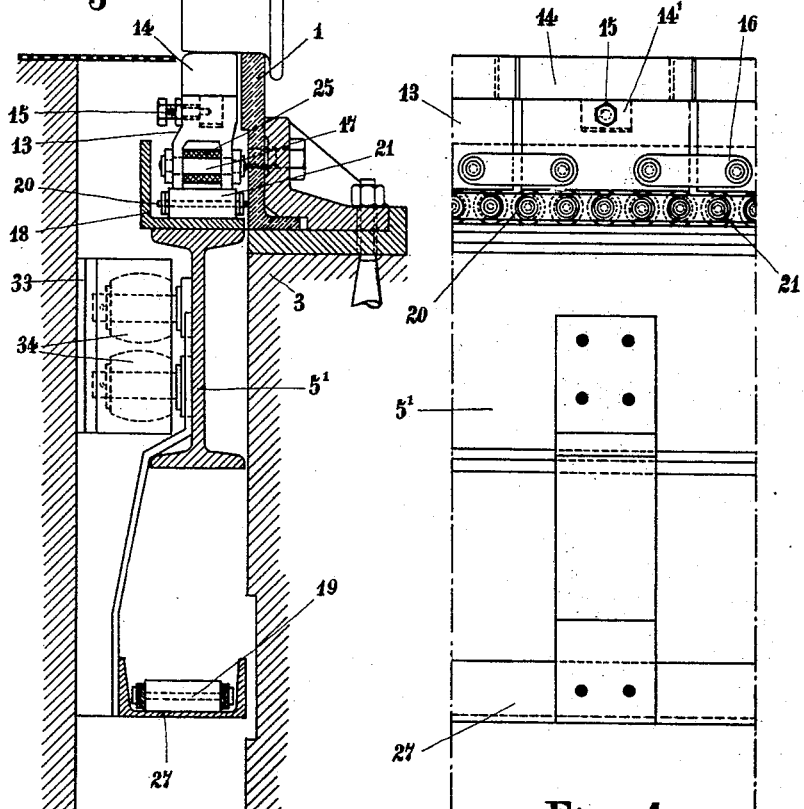

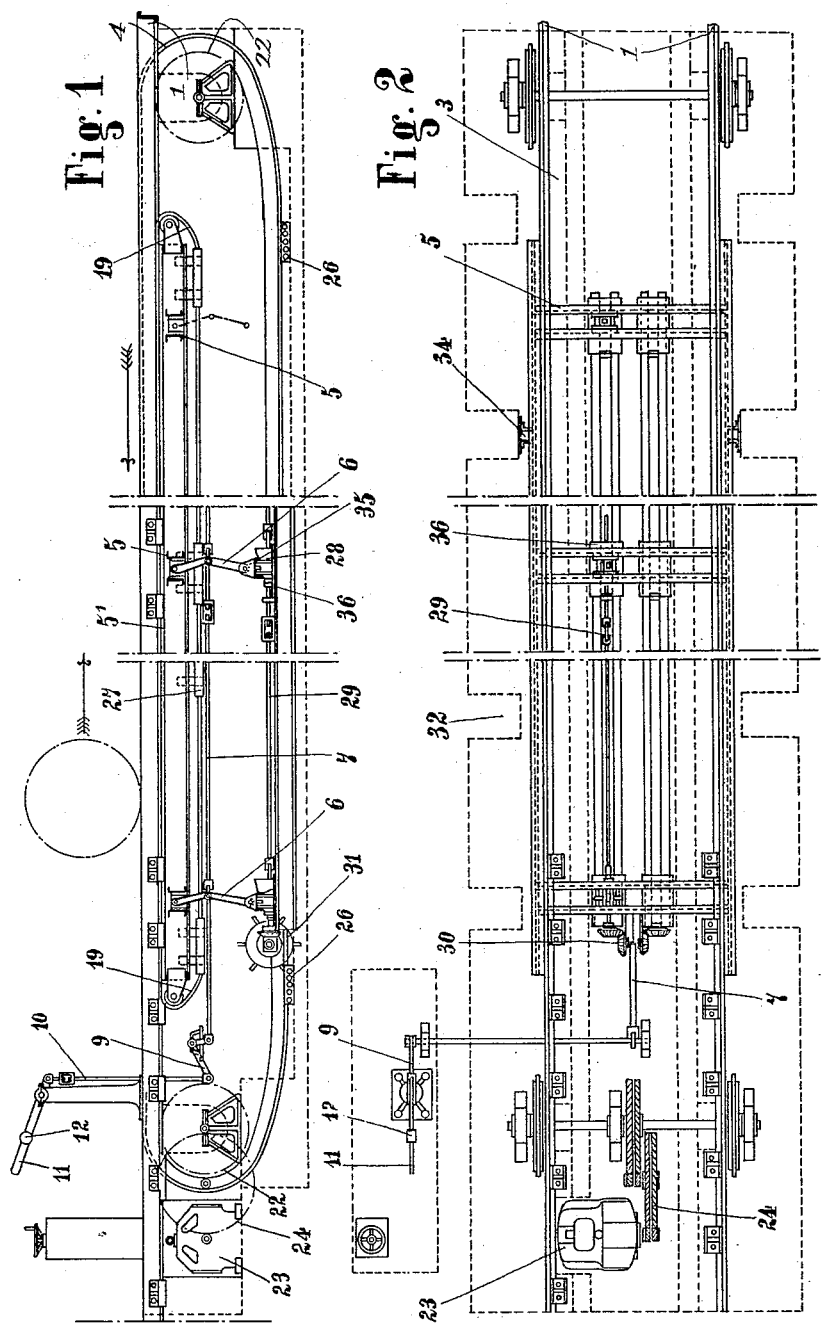

UNITED STATES PATENT OFFICE.

ERNST RAMMELSBERG, OF DORTMUND, GERMANY, ASSIGNOR TO THE FIRM OF BOTH & TILMANN, GESELLSCHAFT MIT BESCHRÄNKTER HAFTUNG, OF DORTMUND, GERMANY.

RAIL-BRAKE FOR RAILROAD-CARS.

1,195,086.  Specification of Letters Patent.  Patented Aug. 15, 1916.

Application filed May 22, 1915. Serial No. 29,818.

*To all whom it may concern:*

Be it known that I, ERNST RAMMELSBERG, a subject of the German Emperor, and residing at 44 Dresdenerstrasse, Dortmund, Germany, engineer, have invented certain new and useful Improvements in Rail-Brakes for Railroad-Cars, of which the following is a statement.

The present invention relates to a brake arrangement for railroad cars, which arrangement is fitted into the track at a given point and is intended to brake the cars, running without engine, from below. In shunting depots the cars are allowed to run off the falling track and generally reach the shunting switches at too high a velocity. The brake arrangements hitherto employed such as brake shoes, inside brakes or also devices for increasing the rolling friction by increasing the track resistance and the like more, have proved to be, in most cases, insufficient, wear heavily on the rails and cars and frequently cause trouble or stoppages by their sudden action.

With the brake arrangement according to the present invention, which acts without any jar or shock with a sliding friction from below against the face of the wheels, the brake effect may be regulated at will. This is obtained by a brake strap, for example a chain of brake blocks, being moved by means of a suitable driving gear, close along the rails having suitable parts cut away, and being pressed against the face of the wheels for braking these, so that owing to the friction between the traveling brake blocks and the face of the wheels a brake action on the car is effected. The brake arrangement is preferably supported in a rigid frame, the weight of which is counterbalanced, and which frame is readily raised or lowered by an operator by means of a lever or a handwheel, so that the brake pressure may be regulated within the widest limits by a more or less great manual force being applied to the said lever or handwheel.

In the accompanying drawings a constructional form of the rail brake according to the present invention is exemplified, Figure 1 being a side elevation, Fig. 2 a plan, and Fig. 3 a cross section. Figs. 4 and 5 show the brake chain and its support in side elevation and cross section, respectively. Fig. 6 is a front elevation of the brake chain.

At the place where the brake action is desired the track is interrupted for a length corresponding to the length of the brake arrangement, and rails 1 with narrow heads 2 and bases $2^a$ are securely fixed to the bedding 3 along the said interruption in the track. On the outer side of the said bedding a sufficient space is provided for the brake chain 4 to travel in, so that the latter can act on the face of the wheels. This brake chain is carried over a frame, composed of longitudinal girders 5' and transverse girders 5, which frame is supported on pairs of toggle levers 6. Connecting rods 7 are hingedly secured by pins 8 to said toggle levers 6 and by rods 9 and 10 to an operating lever 11. In place of the operating lever 11 a handwheel may be employed. The weight of the frame and the brake arrangement is counterbalanced by means of a weight 12 fitted to the operating lever 11 in such a manner, that it is only necessary to exert on the operating lever, or the handwheel, respectively, such force, as is required for producing the friction on the face of the wheels.

The brake chain 4 is composed of a plurality of links, 13 (Figs. 4 and 5) onto which the brake blocks 14 are fitted from above by means of pins 14', where they are securely held by set screws 15, so that they may be exchanged when worn. For allowing the brake surface to have as continuous an effect as possible, the individual brake blocks engage with each other by means of tongues and grooves.

The individual links 13 are coupled together by means of straps 16 to form an endless chain. On the longitudinal girders 5' of the frame an angular guide 18 is fitted, which receives the brake. For reducing the friction between the brake chain 4 and the guide 18 as far as possible, a roller band 19 (Figs. 1 and 6) is interposed between them, which is composed of rollers 21, coupled with each other by means of links. When the brake chain 4 is moved along its race it travels on the roller band 19, which, owing to the rotation imparted to its rollers, travels along the angular guide 18. The endless brake chain passes at both ends of the brake arrangement over sprockets 22 (Fig. 1) of which the one is loose on its shaft and is moved by the chain, while the other is driven by a motor 23 and a suitable intermediate gearing 24. The teeth of the sprocket 22 engage from below in the links 13 of the brake chain 4 and thereby advance the chain. The hanging part of the chain is carried on roller bearings 26 provided on the bottom of the pit. The roller band 19, which is advanced without any drive of its own, as it rolls on its own rollers, is supported beneath the longitudinal girder 5' by guide straps 27 attached thereto, whereby it is guided.

The bearings 35 of the pairs of toggles 6 carrying the girder frame 5, 5' are fitted to a common frame of rolled irons. As the brake blocks 14 will, by use, gradually wear off and become thinner, these bearings 35 are vertically adjustable by their base plate resting on a frame 36 and wedges 28. When the brake blocks have worn so far, that owing to the limited stroke of the toggles 6 the required brake pressure can no more be produced by means of the operating lever or handwheel 11, the wedges 28, which are coupled by means of rods 29 and gearing 30 are evenly tightened by a driving gear 31, whereby all supporting bearings are evenly raised. The foundation pit is provided outside of the tracks with concrete piers 32 on which the cover slabs or plates are placed. In some of these piers, which are disposed at a given pitch, guides 33 having vertical slots are fitted at the sides, in which a pair of rollers 34 of the girder frame 5, 5' are guided when the brake arrangement is raised and lowered. Thereby lateral displacements of the girder frame are prevented and the horizontal forces produced by the brake action are thereby taken up.

The brake chain 4 receives a slow motion, the direction of which is contrary to that of the car, will, when the girder frame is raised, partly take the load off the track rails 1 and will carry a small part of the weight of the car, while the greater part of the weight of the car will, in consequence of the friction between the wheels and the stationary track cause the wheels to roll along corresponding to the velocity of the car. Thereby a gliding movement will be produced between the faces of the wheels and the brake chain, which, by the friction thereby produced, will retard the velocity of the car.

I claim:

1. Rail brake for railroad cars consisting of brake chains, disposed in the track and adapted to be pressed against the face of the car wheels, and means for moving said brake chains parallel to said track and in a direction opposite to that in which the car is running.

2. Rail brake, for railroad cars consisting of brake chains, disposed in the track and adapted to be pressed against the face of the car wheels, means for moving said brake chains parallel to said track and in a direction opposite to that in which the car is running, a frame over which said brake chains are moving, toggle levers supporting said frame, an operating lever, and means for operatively connecting said toggle levers with said operating lever.

3. Rail brake for railroad cars consisting of brake chains, disposed in the track and adapted to be pressed against the face of the car wheels, means for moving said brake chains parallel to said track and in a direction opposite to that in which the car is running, a frame supporting said brake chains, toggle levers for raising and lowering said frame, and a roller band interposed between said brake chains and frame for reducing the friction between said chains and frame.

4. Rail brake for railroad cars consisting of brake chains disposed in the track, chain links forming said chains, and brake blocks exchangeably fitted into said links, a tongue and groove connection between said blocks, means for pressing said brake chains with the brake blocks against the face of the car wheels, means for moving said brake chains parallel to said track and in a direction opposite to that in which the car is running, a frame supporting said brake chains, toggles for raising and lowering said frame and a roller band interposed between said brake chains and said frame for reducing the friction between both, substantially as described.

5. Rail brakes for railroad cars consisting of brake chains disposed in the track, links forming said brake chains and brake blocks exchangeably fitted into said links, a tongue and groove connection between said blocks, means for pressing said brake chains and the brake blocks against the face of the car wheels, means for moving said brake chains parallel to said track and in a direction opposite to that in which the car is running, a frame supporting said brake chains, a roller band interposed between said brake chains and said frame, toggles for raising and lowering said frame, coupled wedges supporting said toggles, bearings for said wedges, and means for displacing said wedges simultaneously and evenly within their bearings, substantially as described.

ERNST RAMMELSBERG. [L. S.]

Witnesses:
 HELEN NUFER,
 ALBERT NUFER.